United States Patent [19]

Gibbons

[11] Patent Number: 4,582,501
[45] Date of Patent: Apr. 15, 1986

[54] SOUND ISOLATION COUPLING

[75] Inventor: Charles B. Gibbons, Whitesboro, N.Y.

[73] Assignee: Allied Corporation, Morris Township, Morris County, N.J.

[21] Appl. No.: 547,144

[22] Filed: Oct. 31, 1983

[51] Int. Cl.$^4$ ............................ F16D 3/00; F16D 3/58
[52] U.S. Cl. ........................................ 464/85; 464/96
[58] Field of Search .................. 464/85, 87, 92, 96, 464/180, 149, 89, 84, 73, 76, 75, 81, 94; 74/574

[56] References Cited

U.S. PATENT DOCUMENTS

| | | | |
|---|---|---|---|
| 2,067,284 | 1/1937 | Pearce | 464/96 |
| 2,126,169 | 8/1938 | Brownyer et al. | 464/96 X |
| 2,328,614 | 9/1943 | Busse | 464/96 X |
| 2,466,218 | 4/1949 | Farrell et al. | 464/75 |
| 2,643,153 | 6/1953 | Boschi | 464/96 X |
| 2,932,179 | 4/1960 | Grant | 464/76 |
| 3,080,732 | 3/1963 | Crankshaw . | |
| 3,080,733 | 3/1963 | Crankshaw . | |
| 3,080,734 | 3/1963 | Crankshaw . | |
| 3,257,826 | 6/1966 | Peterson | 464/85 |
| 3,505,832 | 4/1970 | Braithwaite . | |
| 3,575,014 | 4/1971 | Wright . | |
| 3,808,837 | 5/1974 | Anderson et al. . | |
| 3,995,448 | 12/1976 | Wright . | |
| 4,023,438 | 5/1977 | Birkle et al. | 464/96 X |
| 4,191,030 | 3/1980 | Calistrat . | |

FOREIGN PATENT DOCUMENTS

| | | | |
|---|---|---|---|
| 2029223 | 12/1982 | Fed. Rep. of Germany | 464/87 |
| 491413 | 11/1955 | Italy | 464/76 |
| 694311 | 7/1953 | United Kingdom | 464/92 |
| 1335663 | 10/1973 | United Kingdom | 464/85 |

OTHER PUBLICATIONS

W. Ker Wilson, Practical Solution of Torsional Vibration Problems (Second Edition, Wiley & Sons, New York 1941), vol. 2, pp. 452-473.

Primary Examiner—John M. Jillions
Assistant Examiner—Thomas R. Hannon
Attorney, Agent, or Firm—Stan Protigal; Howard Massung

[57] ABSTRACT

A vibration and noise isolating coupling (11) for a rotating drive train uses a plurality of vibration and noise isolating modules (17) which are arranged circumferentially about the coupling (11) in two rows (21, 22). Each module consists of a plurality of rubber sheets separated by laminations. A pair of drive discs (13, 14) sandwich the modules (17), and a driven disc (15) is located between the two rows (21, 22) of the module (17). Force transmitted from the drive discs (13, 14) is transmitted through the driven disc (15) via the modules 17. The drive discs (13, 14) are compressed toward one another, thereby compressing the module (17) and consequently the rubber sheets within the module (17).

The arrangement provides the advantage of resiliently transferring rotating force to rubber components while maintaining the rubber in a compressed state and maintaining a power-transfer capability even if the rubber components are fully deteriorated.

7 Claims, 6 Drawing Figures

SOUND ISOLATION COUPLING

BACKGROUND OF THE INVENTION

This invention is in the field of vibration and noise suppression and relates to vibration and noise suppression in a rotary drive train. More particularly, the invention relates to vibration and noise suppression by use of a vibration isolator in the rotary drive train.

In many drive applications, it is desired to reduce transmitted noise, such as gear noise, transmitted through a drive train in order to reduce the amount of noise being transmitted to the environment, as well as to reduce adverse effects of vibration on various parts. Vibration and noise control may be effected by vibration dampers and by vibration isolators. Vibration dampers control vibration primarily by converting the vibration motion into heat, whereas vibration isolators control vibration by reducing the ability of the system to transmit vibrations past the isolator. The present invention is directed primarily to vibration and noise control by use of a vibration isolator, although a certain degree of damping is also anticipated. The invention uses rubber, which is a common material for vibration isolation and has various advantages, including minimum effect of shape on resiliency of the isolating material (rubber). Rubber exhibits a fairly linear load-deflection response, particularly under shear loads.

A disadvantage of rubber is that it has a tendency to tear or separate, at bonded edges and within the rubber itself, under tensile loading. In general, failure under tensile load becomes a limiting factor in the use of rubber for transferring force. As with any vibration isolating system, rubber also is prone to decomposition. This decomposition is most likely to occur under abnormal heat conditions such as fire, although other factors such as chemical attack, can result in failure by decomposition.

In one type of vibration absorber, layers of rubber are bonded to interdigited metal discs associated alternately with driving and driven members of a drive shaft coupling. The rubber is subjected to substantially shearing loads. Decomposition of the rubber would allow the metal discs to freely rotate with respect to one another, in a manner similar to a released multiple-plate clutch. Tearing of the rubber bond with the metal would result in a tendency of the discs to slip, and therefore cause rapid deterioration of the rubber.

It is an object of this invention to provide a vibration and noise absorbing coupling for a power drive shaft, which is effective and reliable and which will continue to transmit power in emergency circumstances after a vibration absorbing media has been damaged. It is therefore desired to provide a vibration absorbing coupling in which rubber is used and is maintained under a compressive load so that drive forces transferred through the coupling have a reduced tendency to tear the rubber. It is further desired that the coupling be able to maintain its ability to transfer power under emergency circumstances, so that power can be transferred through the rubber when the rubber is partially deteriorated and power can be transmitted through the coupling when the rubber has completely deteriorated.

SUMMARY OF THE INVENTION

This invention contemplates the rotary drive shaft coupling in which a plurality of sheets of rubber are interspaced with metal sheets to form a stack. The stacks are placed between conforming plates to form modules and a plurality of the modules are placed between driving and driven discs so that the layers of rubber extend radially between the discs. The stacks are chevroned so that sequential bends or corners in the contours occur circumferentially and extend radially. Radial gaps are left in the rubber, preferably where the chevrons bend.

In the preferred embodiment, a pair of driven discs sandwich two sets of modules and a drive disc, or vice versa. The two outside discs are used to compress the sandwiched assembly and consequently to compress the rubber sheets in the axial direction. This arrangement reduces or eliminates the occurrence of tensile stress when torque is applied to the coupling. The chevron arrangement of the stacks ensures that power is transferred through the rubber even when the rubber is partially deteriorated.

DETAILED DESCRIPTION OF THE DRAWINGS

DETAILED DESCRIPTION OF THE PREFERRED EMBODIMENT

Figure 1:
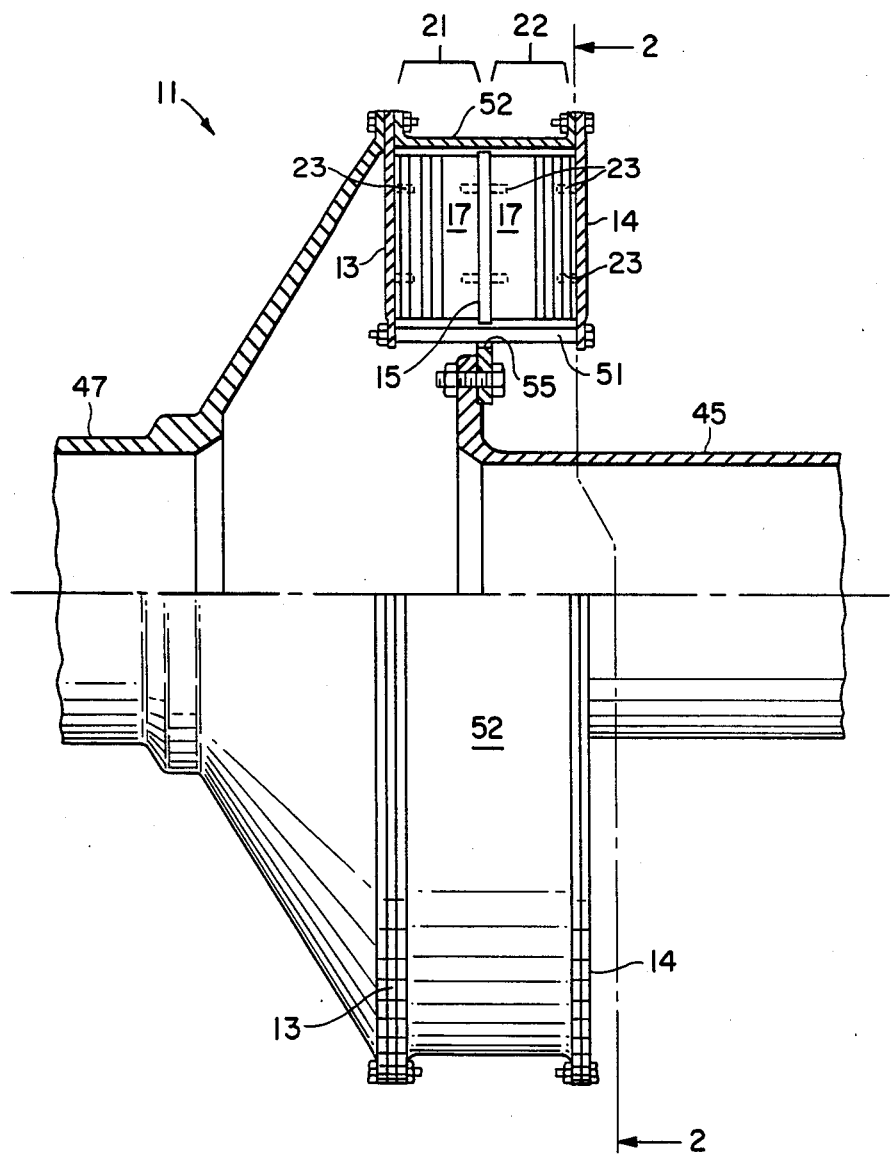
FIG. 1 is a partially sectioned side view of a vibration and noise isolating coupling made in accordance with the invention.
Figure 2:
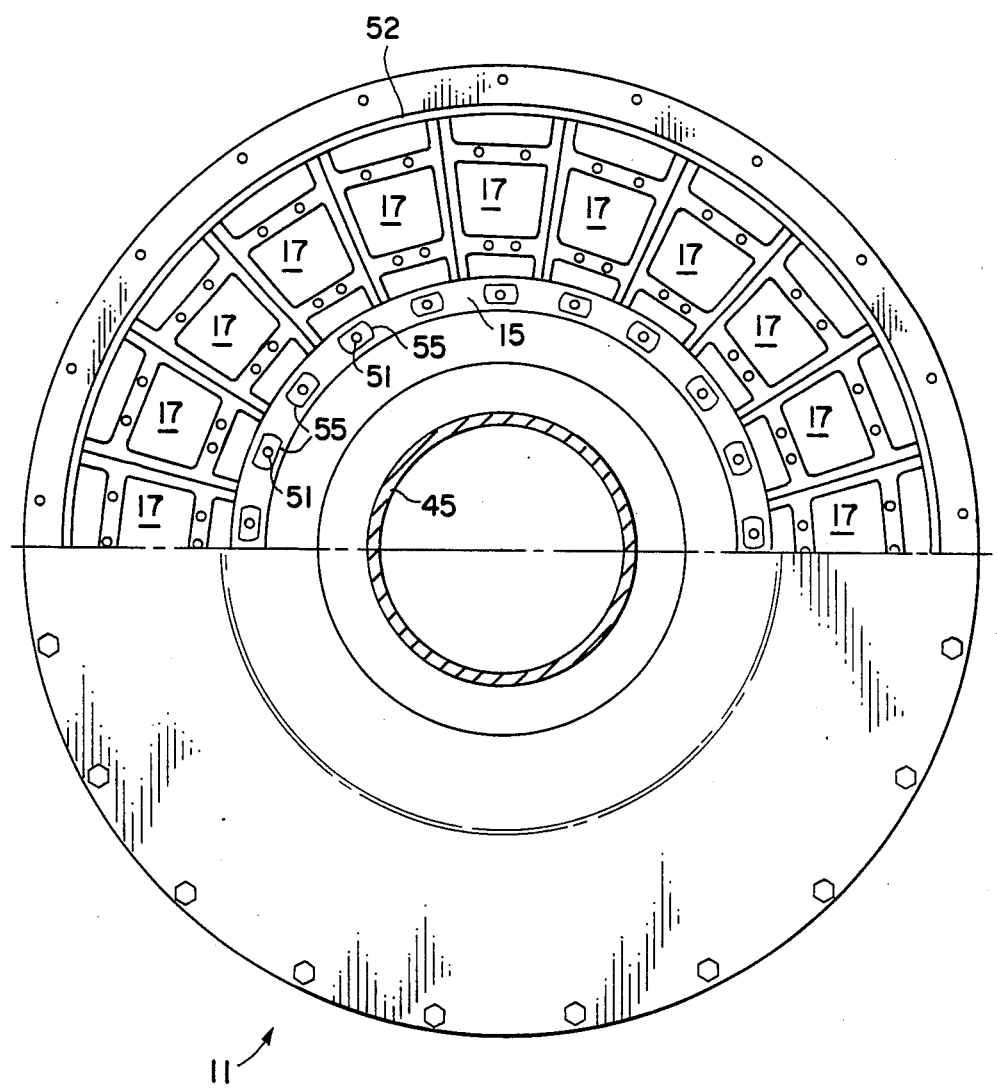
FIG. 2 is an end view of the vibration and noise isolating coupling of FIG. 1, taken along Section 2—2 of that figure.
Figure 6:
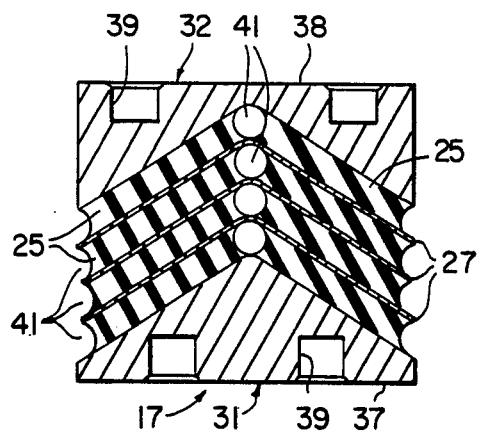
FIG. 6 is a cross-sectional view of the module of FIG. 3 taken along lines 6—6 of FIG. 4.

In FIGS. 1 and 2, a vibration and noise isolating coupling 11 constructed in accordance with a preferred embodiment of the invention is shown. The coupling 11 is intended to join driving and driven members (not shown) of a rotating drive train so as to transmit driving power as torque without transmitting minor fluctuations in the torque which would be considered to be vibration and noise. For the purposes of this description, vibration and noise are similar in nature and will hereinafter be described merely as vibration.

The coupling 11 includes a pair of drive discs 13, 14 and a driven disc 15, most clearly seen in FIG. 1. Mounted to both the drive and the driven discs 13–15 are a plurality of vibration isolating modules 17, also seen in FIG. 2. Referring again to FIG. 1, the vibration isolating modules 17 are distributed into rows 21,22 along the circumference of the coupling 11, so that one of the rows 21 is between one drive disc 13 and a driven disc 15 and the other row 22, is between the other drive disc 14, and the driven disc 15. The modules 17 are each restrained by pins 23 from movement relative to their adjacent respective drive disc 13 or 14 and to the driven disc 15 so that rotational force exerted by the drive discs 13,14 is transferred to the driven disc 15 through the modules 17 as will be described.

Referring to FIGS. 3–6, as single vibration isolating module 17 is shown. The active elements in the module 17 are elastomeric insulating material such as rubber sheets 25, which are arranged in a stack with steel laminations 27 between adjacent rubber sheets 25. On either side of the stack of sheets 25 and laminations 27 is a conforming casting 31,32. Conforming casting 31 is mounted to one of the drive discs 13,14 and is considered to be the outer conforming casting. Conforming casting 32 is mounted to the driven disc 15 (FIG. 1) and is considered to be the inner conforming casting. As can be seen, the steel laminations 27 and the conforming castings 31,32 each have a vee shape. For this reason, the conforming castings 31,32 have flanges 35,36 which present flat surfaces 37,38 which mate with the discs 13-15. A plurality of holes 39 receive the pins 23 to retain the modules 17 in position.

The use of separate modules 17 allows the coupling 11 to be assembled and disassembled in a restricted space. For example, in the restricted space of a crowded machinery room, the modules 17 can be readily inspected and individual modules 17 can be replaced.

Figure 3:
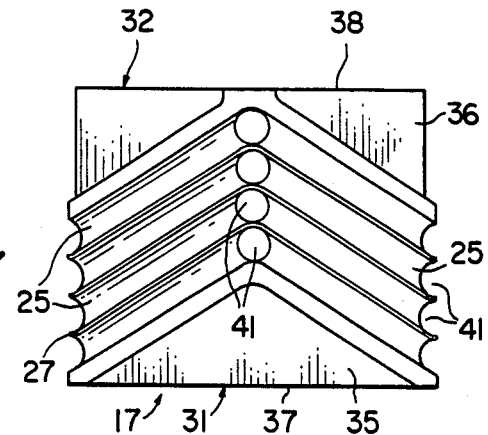
FIG. 3 is an outer end view of a vibration and noise isolating module used in the coupling of FIGS. 1 and 2.
Figure 5:
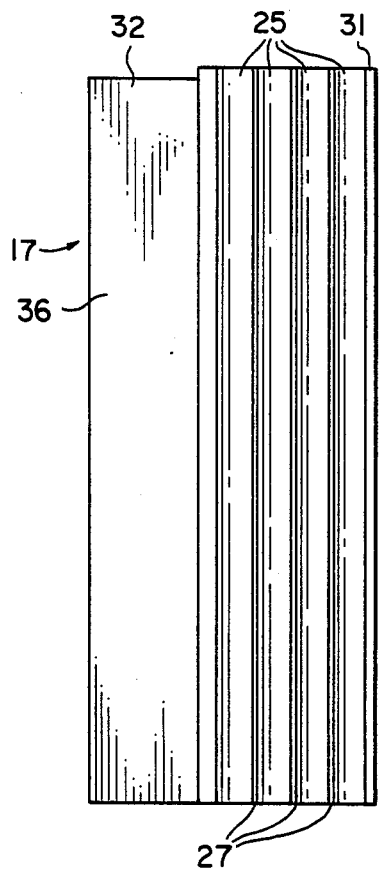
FIG. 5 is a tangential view of the module of FIG. 3.
Figure 4:
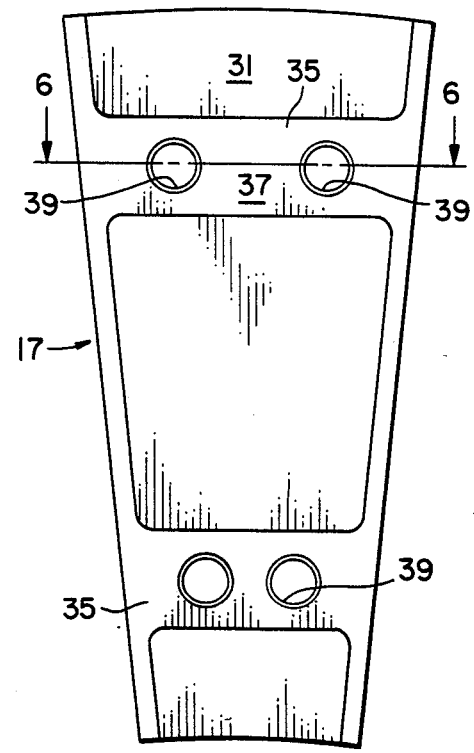
FIG. 4 is an outer side view of the isolating module of FIG. 3, viewed from the same direction as FIG. 2.

As can be seen from FIG. 3, the rubber sheets 25 are formed so that openings 41 exist between adjacent rubber sheets 25 even at the same layer. These openings 41 occur at each turn of the laminations 27 so that, even though the laminations 27 and the conforming castings 31,32 are vee shaped, the individual rubber sheets 25 are flat. More importantly, the openings 41 permit the rubber sheets 25 to expand when the rubber sheets 25 are compressed or are otherwise exposed to distorting forces. This is important because almost all rubbers have less volume compressibility than water. For example, at a hydrostatic pressure of 200 N/mm$^2$, the reduction from original volume of water is 7.3% whereas selected soft and hard rubbers have a percentage decrease in volume of from 6.5% to 4.7%. For this reason, it is necessary to provide expansion space for rubber if elastic compression of the rubber sheets 25 is to be achieved.

As can be seen in FIGS. 1 and 2, a plurality of vibration isolating modules are mounted in two rows between the drive discs 13,14. In the preferred embodiment, thirty modules 17 are installed in each row 21,22 for a total of sixty modules 17 in the coupling 11. As can be seen in FIG. 1, the driven disc 15 is bolted to an output shaft 45. One of the drive discs 13 is bolted to an input shaft 47. The other drive disc 14 is connected to drive disc 13 by means of inner tie bars 51 and an outer connector tube 52. Thus, the inner tie bars 51 and the outer connector tube 52 form tension connectors 51,52 between the drive discs 13,14.

The outer connector tube 52 forms a cylinder which extends around the circumference of the coupling 11. This enables the outer connector tube 52 to rotationally fix drive disc 14 to drive disc 13. The drive disc 15 does not engage the outer connector tube 52 and the driven disc 15 has slots 55 which are large enough so that, under normal circumstances, the tie bars 51 do not engage the driven disc 15. Thus, the rotational movement of the drive discs 13,14 with respect to the driven disc 15 is controlled by the vibration isolation modules 17, which are located between the discs 13-15.

Torque at drive disc 13 is transferred to drive disc 14. Any torque existing between the driven disc 15 and the drive discs 13,14 would result in conforming castings 31,32 tending to move in opposite directions, parallel to surfaces 37 and 38 and sideways across the chevrons formed by the laminations 27, assuming a separation distance between the surfaces 37, 38 is fixed by the drive discs 13,14. This would result in some of the rubber sheets 25 experiencing tension while other sheets 25 are experiencing compression. Excessive tensile stress tends to encourage the rubber sheets 25 to tear and to separate from the laminations 27 and the conforming castings 31,32. In order to avoid this tensile stress on the rubber sheets 25, the conforming castings 31,32 are compressed toward one another by means of the connectors 51,52. In the preferred embodiment, a force of 1.5N/mm$^2$ is applied to the rubber sheets 25 in this manner. This creates a compressive force on the rubber sheets 25, even though torque is applied through the coupling 11. Due to their resiliency of the rubber sheets 25, the coupling 11 is able to transmit the torque without exerting tensile stress on any of the rubber sheets 25.

In the event that the rubber sheets 25 deteriorate to the point that the chevron configuration is no longer sufficient to transmit torque through the modules 17, the discs 13-15 must be restrained. This is accomplished by the inner tie bars 51 and the slots 55. While the inner tie bars 51 do not normally engage the driven disc 15 at the slots 55, such engagement is possible when the rubber deteriorates.

The use of several layers of rubber sheets 25 adds to the stability of the coupling 11 without sacrificing vibration absorbing qualities. It is also possible to use the specific geometric and physical properties of the materials in order to provide modified response from the coupling 11. For example, the rubber sheets 25 can be formed of more than one type of material within the same module 17. This would provide a different response for forces applied in opposite directions. In the preferred embodiment, each of the rubber sheets 25 has the same composition because the sheets 25 are molded into the modules 17 while the modules 17 are in an uncompressed state. The molding of the rubber into the modules also bonds the sheets 25 to the laminations 27 and the conforming castings 31,32, as appropriate.

While the coupling 11 has been described as using the rubber sheets 25, it is likely that synthetic elastomers will be substituted for natural rubber. Likewise the steel laminations 27 could alternatively be made out of different materials, such as thermosetting plastic. It is also possible to provide other arrangements in the specific structural configuration shown in the preferred embodiment. For example, a larger number of discs and a different number of rubber sheets 25 can be used. It is also possible to use differing numbers of vibration isolation modules 17, leaving gaps between adjacent vibration isolator modules 17. While the matching pair of discs 13,14 have been described as the drive discs, it is also possible to operate the coupling 11 with the pair of disc 13,14 being driven discs and the single disc 15 being the drive disc.

These changes and other changes being possible, it is desired to limit the invention only as described in the claims.

What is claimed is:

1. Drive coupling for transmitting rotary force in a drive train and utilizing an elastomeric material to isolate vibration, characterized by:
    (a) first and second coaxial discs;
    (b) a plurality of layers of elastomeric insulating material located between the discs;
    (c) means to compress the insulating material while permitting torque to be transmitted between the first and second discs, the torque being transmitted through the elastomeric material primarily as a shearing force;

(d) a lamination of substantially non-elastomeric material separating at least two of said layers, wherein the lamination cooperates with the means to compress to avoid excessive tensile stress on the elastomeric material;

(e) the elastomeric material being chevroned between supporting extensions of the discs;

(f) the extensions of the discs and the elastomeric material being combined in a plurality of individual modules;

(g) the chevroned elastomeric material including a plurality of locations where the profile of the elastomeric material bends; and (h) openings at a plurality of said locations.

2. Apparatus as described in claim 1, further characterized by:

(a) a third disc coaxial with the first and second discs wherein the second disc is axially between the first disc and the third disc;

(b) said layer plurality of layers of elastomeric material being housed axially between the first disc and the second disc;

(c) a second plurality of layers elastomeric insulating material, the second plurality of layers being housed axially between the second disc and the third disc; and (d) the compression means including means to connect the first and third discs together so that said first and third discs exert a compressive force against the elastomeric material.

3. Apparatus as described in claim 2, further characterized by:

the elastomeric material being chevroned between supporting extensions of the discs.

4. Drive coupling for transmitting torque in a drive train and utilizing elastomeric material to isolate vibration, characterized by:

(a) at least three coaxial members;

(b) a first plurality of layers of elastomeric insulating material separating a first of the three coaxial members from a second of the three coaxial members, and a second plurality of layers of elastomeric insulating material separating the second coaxial member from a third of the three coaxial members;

(c) the first plurality of layers and second plurality of layers of elastomeric insulating material being chevroned with the coaxial members;

(d) means to prevent the coaxial members from separating in order to maintain the coaxial members in engagement with the elastomeric material;

(e) means to compress said layers of elastomeric material so that when torque is exerted between the coaxial members, said compressive force tends to supersede any forces resulting from the torque which would ten to create a tensile stress on the elastomeric material;

(f) a lamination of substantially non-elastomeric material separating at least two of said layers, wherein the lamination cooperates with the means to compress to avoid excessive tensile stress on the elastomeric material;

(g) the elastomeric material being chevroned between supporting extensions of the discs;

(h) the extensions of the discs and the elastomeric material being combined in a plurality of individual modules;

(i) the chevroned elastomeric material including a plurality of locations where the profile of the elastomeric material bends; and (j) openings at a plurality of said locations.

5. Apparatus as described in claim 4, further characterized by:

means to rotationally fix the third coaxial member to the first coaxial member.

6. Apparatus as described in claim 5, further characterized by:

(a) The three coaxial members being axially separated, with the second coaxial member located between the first coaxial member and the third coaxial member;

(b) the second coaxial member being connected to a first drive line connection; and (c) the first and third coaxial members being connected to at least one drive line connection opposed to the first drive line connection such that the drive coupling transmits torque between the first drive line connection and the opposed drive line connection.

7. Drive coupling for transmitting rotary force in a drive train and utilizing an elastomeric material to isolate vibration, characterized by:

(a) first and second coaxial discs;

(b) a plurality of layers of elastomeric insulating material located between the discs, the elastomeric material being chevroned between supporting extensions of the discs;

(c) means to compress the insulating material while permitting torque to be transmitted between the first and second discs, the torque being transmitted through the elastomeric material primarily as a shearing force;

(d) a lamination of substantially non-elastomeric material separating at least two of said layers, wherein the lamination cooperates with the means to compress to avoid excessive tensile stress on the elastomeric material;

(e) the elastomeric material being chevroned between supporting extensions of the discs;

(f) the extensions of the discs and the elastomeric material being combined in a plurality of individual modules;

(g) the chevroned elastomeric material including a plurality of locations where the profile of the elastomeric material bends; and (h) openings at a plurality of said locations.

* * * * *